United States Patent
Simmonds et al.

[11] Patent Number: 5,893,116
[45] Date of Patent: Apr. 6, 1999

[54] ACCESSING NETWORK RESOURCES USING NETWORK RESOURCE REPLICATOR AND CAPTURED LOGIN SCRIPT FOR USE WHEN THE COMPUTER IS DISCONNECTED FROM THE NETWORK

[75] Inventors: Christopher D. Simmonds, Andover; Ian Jack, Grange Park; Dusan Marincic, Basingstoke; Anthony M. Wilkes, Oxford, all of United Kingdom

[73] Assignee: Novell, Inc., Provo, Utah

[21] Appl. No.: 724,078

[22] Filed: Sep. 30, 1996

[51] Int. Cl.[6] ................................... G06F 15/163
[52] U.S. Cl. .............. 707/201; 395/200.59; 395/200.56; 395/200.47
[58] Field of Search ............... 395/200.3, 200.53, 395/200.59; 370/402; 380/25; 703/200, 201

[56] References Cited

U.S. PATENT DOCUMENTS

| | | | |
|---|---|---|---|
| 5,349,642 | 9/1994 | Kingdon | 380/25 |
| 5,404,528 | 4/1995 | Mahajan | 395/650 |
| 5,491,820 | 2/1996 | Belove et al. | 395/600 |
| 5,572,528 | 11/1996 | Shuen | 370/402 |
| 5,588,147 | 12/1996 | Neeman et al. | 395/601 |
| 5,596,574 | 1/1997 | Perlman et al. | 370/389 |
| 5,608,903 | 3/1997 | Prasad et al. | 707/10 |
| 5,689,706 | 11/1997 | Rao et al. | 395/617 |
| 5,692,180 | 11/1997 | Lee | 395/610 |
| 5,721,916 | 2/1998 | Pardikar | 707/201 |
| 5,742,820 | 4/1998 | Perlman et al. | 707/201 |
| 5,784,560 | 7/1998 | Kingdon et al. | 395/200.31 |

FOREIGN PATENT DOCUMENTS

| | | |
|---|---|---|
| 0 663 640 A1 | 1/1995 | European Pat. Off. . |
| 0 713 183 A2 | 11/1995 | European Pat. Off. . |

OTHER PUBLICATIONS

Data Club Classic, Apple Macintosh System 7 Companies, 5 pages.

Disconnected Operation in the Coda File System, James J. Kistler et al., Pittsburgh, PA 1991, pp. 214–225.

Novell DataClub User's Guide NetWare, pp. 1–90, 1992.

Primary Examiner—Dung C. Dinh
Assistant Examiner—Hassan Ibrahim
Attorney, Agent, or Firm—Cesari and McKenna LLP

[57] ABSTRACT

A Replication and Synchronization Engine (RSE) provides a user of a mobile computer with a consistent namespace of resources available to a network despite the connection status of the computer. The specifications (names) of the resources as viewed by the user when the computer is connected to the network are identical to the names as viewed by the user when the computer is disconnected from the network. RSE provides such a consistent namespace by maintaining complete, local replicas of a user-selected subset of these resources at the mobile computer, along with local "name-only" representations of the remaining resources. The resources maintained by RSE may include any network resource, such as a server, volume, directory, file, printer queue and other object, that the mobile computer can access.

20 Claims, 5 Drawing Sheets

ACCESSING NETWORK RESOURCES USING NETWORK RESOURCE REPLICATOR AND CAPTURED LOGIN SCRIPT FOR USE WHEN THE COMPUTER IS DISCONNECTED FROM THE NETWORK

BACKGROUND OF THE INVENTION

1. Field of the Invention

The invention generally relates to computer networks and, more particularly, to a technique for reliably utilizing resources of a computer network using a mobile computer.

2. Description of the Related Art

A computer typically includes a processor for executing instructions and processing data, and a memory for storing these instructions and data (collectively referred to hereinafter as "information"). Additional information may be further stored by the computer on various types of storage devices, such as floppy disks, hard disks, compact-disk read-only memories (CD-ROMs), "ZIP" drives and magnetic tapes. Some of these devices are removable while others are fixed. A removable device, such as a floppy disk, must be inserted into ("mounted on") a drive to be accessed by the computer. As its name implies, the removable device can be removed ("dismounted") from the drive, e.g., to transport the information stored on the device to another computer. A fixed device, such as a hard disk, is permanently connected to the computer and is commonly referred to as a "fixed drive."

Since the storage devices provide the computer with the ability to accommodate large quantities of information, the information is often organized in a manner that facilitates quick and efficient access by a user. Typically the information is organized as a hierarchy of volumes, directories and files that is analogous to the organization of paper information in an office. For instance, a computer "file" stores related information, such as the text of a word-processing document or the instructions and data that make up a computer program. The file is typically selected by the user from among other information on a storage device by the issuance of a specification, i.e., a string of characters containing at least one part, depending on the type of information selected.

Each file has a set of attributes, one of which is a file name. The filename typically consists of a first part (which is useful in identifying the file to a user) and a second part (which identifies the kind of information stored in the file) separated by a dot. For example, a word processing document that contains a resume might be named "RESUME.DOC".

Some file properties, such as the size of the file and the date of the most recent modification of the file, are informational and are assigned to the file by the computer; these attributes typically cannot be changed by the user. Other attributes, such as the read-only attribute, can be changed by the user.

Volumes are the fixed and mounted removable storage devices that are accessible to the computer. Each volume on the computer is generally identified by a unique, single "drive letter" followed by a colon, e.g. "C:". These drive letters are generally assigned in alphabetical order. Each volume further includes one or more directories. A directory is much like an index, in that the directory contains a plurality of entries that catalog the names and attributes of related files stored on the volume. Each entry also includes an address of the corresponding file stored on the volume. Thus, when the user attempts to access a file, the directory is consulted to ascertain if the type of access (e.g. read, write, delete or execute) is allowed and, if so, the directory is further consulted to locate the file on the volume.

A directory may also contain subdirectories, each of which may further contain files and/or additional subdirectories. The user or computer program can specify in which directory or subdirectory a file is to be created and can move a file from one directory or subdirectory to another. Hereinafter, both directories and subdirectories are simply referred to as "directories."

A "full-file" specification typically includes the volume (drive letter) and directory in which the file is stored, together with the name of the file. A path to a computer resource (such as a volume, directory or file) includes as much of a full file-specification, beginning with the drive letter, as necessary to uniquely identify the resource. For example, a path to a directory includes the drive letter, directory name and any ancestor directory names. Before accessing a resource, the user (or software) must specify the path to the resource.

An operating system manages a computer's resources by, inter alia, controlling access to those resources by application programs. For example to access a specified file on a volume, an application program passes the file's specification to the operating system, which reads the specified directory on the specified volume to locate the file. The operating system then uses the attributes stored in the directory to prevent unauthorized access to the resources, such as by blocking write operations to a "read-only" file. The operating system also assigns drive letters to all the volumes connected to the computer. Application programs acquire a view of these available resource volumes by first requesting a list of drive letters from the operating system and then examining the directories stored on the volumes associated with the drive letters.

In many cases, users of several computers require ready access to a plurality of files. Exchanging these files on removable devices is awkward at best, and becomes impractical when the computers are separated from each other by large distances. To overcome this problem, the computers may be interconnected by wireline or wireless communication links to form a computer network. If one of the computers (a "client") requires access to a resource, e.g. a file, that is stored by another computer (a "server"), the client sends a request for the resource over the communication link to the server and the server responds by sending the requested resource back to the client.

A server can be configured to serve individual files, directories and/or volumes. A network redirector is software that is executed by a client which makes these served network resources appear as though they are volumes connected directly to the client. The redirector creates this illusion by assigning a drive letter to each served network resource so software executed by the client can access the resource as though it were a "local" volume. Functionally, the redirector (a) intercepts requests from the software to access the served resources, i.e., requests to access resources whose specifications include one of the network drive letters; (b) forwards the requests to the appropriate servers; (c) receives information returned by the servers; and (d) supplies the information to the requesting software. For a computer connected to a network, drive letters present a unified view, i.e., a namespace, of both local and network resources. Each served network resource typically appears as a separate drive letter (commonly referred to as a "network drive").

Network resources can be specified by schemes other than by drive letter and path. One such scheme, called the Universal Convention (UNC) uses the format \\<network resource>\<path>. The UNC format is well known and, thus, will not be described further herein.

Network resources other than volumes, directories and files can also be served to clients. For example, a printer server enables many client computers to share a printer that is connected to the server. When a printer is connected directly to a computer, it is plugged into either a printer port (such as "LPT1:") or a communication port (such as "COM1:") of the computer, and application programs send print requests to the port. Served printers are represented by redirected ports on the client computer, in the same way that served volumes are represented by redirected drive letters. That is, the network redirector intercepts print requests that are sent to the redirected port and the redirector sends these requests to the appropriate printer server. The server typically queues these requests and fulfills them according to a first-in-first-out (FIFO) or priority-driven scheme.

In a peer-to-peer network, each computer can play a dual role, i.e., the roles of a client and a server. In other words, a single computer can both access resources through other computers (which act as servers) and serve resources to other computers (which act as clients). On the other hand, in a server-centered network each computer is designate as either a server or a client, but not both. In some large server-centered networks, certain frequently-accessed files, directories, volumes, or even whole servers are duplicated. These duplicated resources are distributed throughout the network to reduce the workload placed on any single server and to place the duplicates close to concentrations of clients. Clients generally request services from the closest servers to minimize the time consumed when exchanging information between the computers.

A user of a client computer must typically "log in" to a network before gaining access to the network's resources. Logging in typically involves providing a correct password to the computer; the correct password ensures that the user is authorized to use the network resources. In most networks if the user requires access to resources that are served by both a first and a second server, the user must log into both of those servers. (The user generally can be logged into several servers at one time.) When a user logs into a server, the client computer typically executes a login script, which is an interpreted computer program that contains a set of instructions for "making" network resources available to the user. That is, the login script configures the network redirector to map (to drive letters and/or redirected ports) the resources provided (served) by the server. For example, the executed script associates a drive letter with a volume of disk storage on the network.

Login scripts are typically stored at a central location of the network and are executed by a login script interpreter resident on the client computer. Several login scripts are typically provided by a network administrator during network installations, although the script may be optionally provided by the user. However login scripts can be quite complex and difficult to maintain, particularly in situations where a user has logged into several servers. The user must further remember the name and password of each server, and must perform the steps necessary to log into each of the servers.

Some network operating systems, such as the NetWare (Version 4) operating system manufactured by Novell, Inc., manage resources in addition to files, directories, volumes and printers. For example, the NetWare system has a distributed, hierarchical database of network information called NetWare Directory Services (NDS). NDS stores, among other things, information about users, access rights and servers. Collectively, entities that are stored and described by NDS are called objects. Some objects list sets of resources (including resources provided by more than one server) that are available to individual users, while other objects limit access to the resources to certain users. NDS avoids the problems associated with logging into several servers by requiring a user of a client computer to simply log into NDS. NDS then uses information provided by a network administrator to connect the client computer to a predetermined set of resources and to limit access to these resources, such as preventing write access to certain files.

Some computers remain connected to a network at all times and thus have continuous access to the network's resources; others are connected to the network only at certain times. During those unconnected times, users of these latter mobile computers, e.g., portable "lap-top" computers, generally do not have access to the network's resources. Mobile computers occasionally connect to the network to, e.g., obtain updated versions of files from a server or to "upload" files from the computer to the server. When connected to the network, the user may also copy files from the server to its mobile computer, although such copying must be selective because the local disk space on the computer makes it impractical to copy the entire network environment.

One problem with the mobile computer involves the differing views of the available resources that are presented to a user when the computer is connected to and disconnected from the network. For example, the copied files are generally stored on drive letters of the mobile computer that are different from the drive letters storing the original files on the server. Accordingly the user must reconfigure application programs to refer to either the local disk or the network drive, depending on the connection status, i.e., connection or disconnection with the network, of the mobile computer.

Since there is no printer server available when the mobile computer is disconnected from the network, the user must save documents destined for the printer until the computer is reconnected to the network. This arrangement is rather burdensome in that it forces the user to interact differently with application programs again depending upon the connection state of the computer. In addition large networks, such as those spanning several buildings, generally provide many points at which computers can be connected to the network. Each time the computer connects to one of these points, the user must ascertain the closest printer server and then configure the network redirector to use that server.

When the mobile computer is reconnected to the network, its files must be synchronized with the corresponding files on the servers. That is, the user must ascertain which version of each file (e.g., the version stored on the computer or the version stored on the server) is "more-current", typically by comparing the contents of the two files. The user then uses that version of the file to update the less-current version of the file. If many pairs of files are involved or if the files are large, the comparison operations may become burdensome.

It is therefore an objective of the invention to provide selective access to network resources from a computer despite the connection status of the computer with respect to the network.

Other objectives will, in part, be obvious and will, in part, appear hereinafter.

SUMMARY OF THE INVENTION

The invention comprises a Replication and Synchronization Engine (RSE) that provides a user of a mobile computer with a consistent namespace of resources available to a network despite the connection status of the computer. That is, the specifications (names) of the resources as viewed by the user when the computer is connected to the network are identical to the specifications as viewed by the user when the computer is disconnected from the network. RSE provides such a consistent namespace by maintaining complete, local replicas of a user-selected subset of these resources at the mobile computer, along with "name-only" representations of some of the remaining resources. The resources maintained by RSE may include any network resource, such as a server, volume, directory, file, printer queue and other "object", that the mobile computer can access.

Name-only resources contribute to the consistent namespace presented by RSE because these resources appear available to a user of the computer even though the computer is not connected to the network. The computer user cannot modify these resources in any manner. Files that are represented in name only are still cataloged in their respective directories. A user may ascertain the files' attributes, such as their file names and access rights; however, the user cannot delete, read or modify the contents of the files, nor change their attributes.

In contrast, local replicas are completely reproduced on the mobile computer; that is, their entire contents are stored locally on the computer. Thus when the mobile computer is not connected to the network, access requests may only be directed to the local replicas. The user has full access to these replicated resources for purposes of reading or modifying their contents. In an alternate embodiment of the invention, when a user attempts to access a name-only resource, RSE may establish a communication link, e.g., over a cellular telephone, with the network and create a local replica of that resource. Thereafter, the user also has full access to that replicated resource, even after the computer is disconnected from the network.

RSE further maintains coherency of the network resource environment by (i) synchronizing the contents of the local replicas with their corresponding resources when the computer is connected to the network, and (ii) selectively resolving conflicts, i.e., "clashes", between the replicas and resources. Specifically, RSE synchronizes the local replicas with their corresponding resources using a multi-stage, state-based synchronization technique. In accordance with this aspect of the invention, synchronization is effected by comparing the resources' current state characteristics rather than their entire contents. This novel technique ensures that changes made to the local replicas are reflected in their corresponding network resources quickly and efficiently. RSE also synchronizes any changes made to the attributes of the name-only replicas with changes made to the attributes of the actual network resources.

RSE implicitly replicates other resources, as necessary. For example, if a user chooses to replicate a group of files, RSE implicitly replicates (i) the directories in which the files are cataloged; (ii) other files in the directories; (iii) all ancestor directories; (iv) the volumes that store the files and the directories; and (v) the servers that store the volumes. RSE determines whether an implicitly-replicated resource is to be fully replicated or replicated in name only.

A clash arises when incompatible changes have been made to the local replicas and to the network resources. The clash is usually discovered when RSE attempts to synchronize the resources. In an attended mode of operation, RSE allows a user to resolve the clash, whereas in an unattended mode, RSE skips the clashing resource, i.e., neither the local replica nor the network resource is updated. Leaving the clash unresolved is similar to not performing a synchronization, so the clash can be resolved by performing the synchronization later.

In yet another aspect of the invention, RSE operates in conjunction with a facility by which a user or network administrator can define groups of resources that are to be replicated (in full and/or in name only). As described herein, the facility is a "mobile file assistant" (MFA) and the groups of resources defined by MFA are "mobile file groups".

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF THE ILLUSTRATIVE EMBODIMENTS

Figure 1:
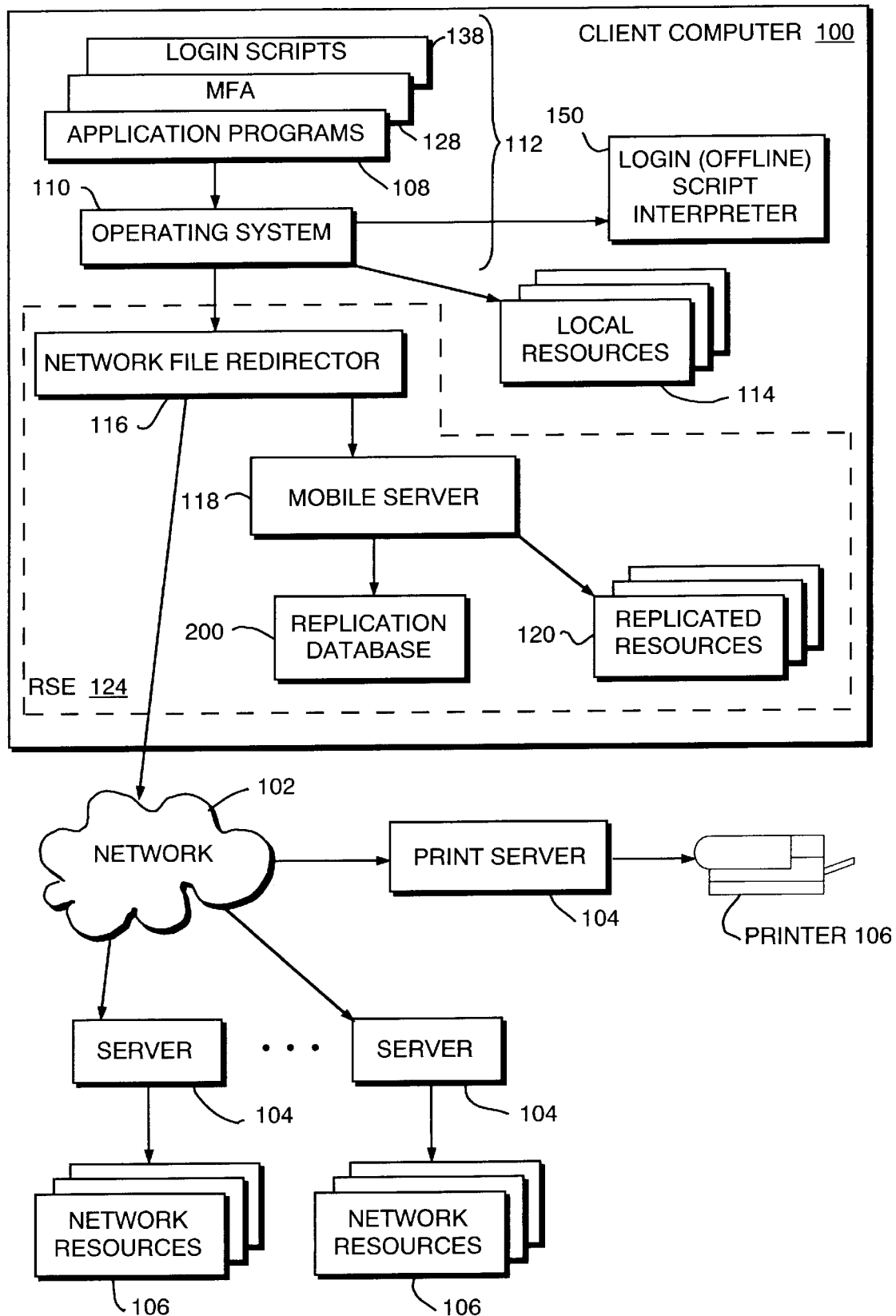
FIG. 1 is a block diagram of a client computer connected by a computer network to server computers.

FIG. 1 illustrates a client (mobile) computer 100 that is connected by a network 102 to three exemplary servers 104, each of which "serves" one or more network resources 106 to application programs 108 and/or an operating system 110 (collectively referred to as "software 112") executed by the computer. The operating system 110 manages local resources 114 connected to the computer 100; as an example, the operating system assigns drive letters, printer ports and communication ports to the local resources as appropriate. When the computer 100 is connected to the network 102, a network redirector 116 generally assigns network drive letters and redirects ports to the network resources 106. The software 112 generates requests to access the network resources 106, and the network redirector 116 forwards these requests to the servers 104. However, when the computer 100 is not connected to the network, the network redirector 116 forwards these requests to a mobile server 118.

The mobile server 118 stores local replicas 120 (alternatively referred to as "replicated resources") of a subset of the network resources 106. The mobile server 118 also maintains a replication database 200 that describes the replicated resources 120; the replication database facilitates serving of these resources to the software 112 and, when the computer is reconnected to the network 102, facilitates synchronization of the replicated resources 120 with the network resources 106. Collectively, the network redirector 116, the mobile server 118, the replication database 200 and the replicated resources 120 are referred to as a "replication and synchronization engine" (RSE) 124. Thus, the RSE 124 enables the software 112 to access the network resources, either directly or via the replicated resources 120, despite the connection status of the client computer 100.

Specifically, the network redirector of RSE operates in accordance with a number of modes. In a first "normal" mode of operation, the computer 100 is connected to network 102 and resources 106 are reachable; the request is forwarded over the network to the appropriate server 104. In a second mode of operation, the computer is connected to the network and the resource is reachable, but the request is forwarded to a local replica 120. Here, the local replica is used as a "cache" memory for the network resource to, e.g., improve performance on a slow-speed link (modem dial-up) by servicing requests locally. An example may involve a single server where word processor application files (.EXE and .DLL) are serviced from the local replica at high speed while data files (.DOC) are forwarded to the server. This second mode embodiment reduces network traffic that is otherwise charged by volume (e.g., ISDN) and improves access reliability on weakly connected links (e.g., radio links) where contact is intermittent.

If the resource is not reachable despite the computer being connected to the network, then in a third mode of operation the request is sent to the local replica. This mode provides access to network resources not currently accessible, e.g., access to a server that is down, and to resources of a local area network (LAN) when physically connected to another LAN. Lastly, if the machine is not connected to the network, the request is forwarded to the local replica. It should be noted that the client computer 100 may access a number of different resources at a time, so combinations of the modes may apply.

One of the application programs 108 is a "mobile file assistant" (MFA 128) that a user employs to select network resources 106 for replication and to specify whether these resources are to be fully replicated or merely replicated in name only. The MFA 128 preferably includes a user interface similar to that provided by the familiar Windows File Manager program. With the assistance of MFA, the user can select individual resources, such as files or other NetWare Directory Services (NDS) objects, or groups of related resources, such as directories and their subdirectories, and request their replication or view their status, as described herein.

NDS comprises a collection of objects that are organized as a hierarchy (i.e., a tree structure) rather like a file system. Each object has a class (type) and information that is dependent upon the class. Objects may be container objects (similar to directories of a file system) or leaf objects (similar to files).

Although a user can select individual network resources 106 for replication, it is usually convenient for the user or a network administrator to create "mobile file groups" of resources from which individual resources may be selected. The MFA 128 also creates these mobile file groups. For each group, the user or administrator specifies the file(s), directory/ies, volume(s), server(s) or other NDS objects that are to be replicated, as well as whether the replication is name only or complete. Information about the mobile file groups is stored in a replication database 200 that is preferably part of an NDS database located on a server. Each mobile file group is generally stored as a stream of characters in an NDS object.

Upon replicating, e.g., objects in a mobile file group, information about the group is added to the replication database 200 on the client computer 100. Any changes to the definition of a mobile file group are propagated to each client computer 100 when the computer connects to the network 102 and attempts to synchronize its replicas 120 with the network resources 106.

When the computer 100 is connected to the network 102 and the user logs into one of the servers 104, a login script interpreter 150 captures a login script 138 which contains certain map commands. Thereafter, when the user logs into the computer at a time it is disconnected from the network, the "offline" interpreter 150 executes the script and, as a result of these map commands, drive letters are assigned to the replicated resources. Thus the namespace as viewed by the software 112 (and user) is constant despite the connection status of the computer 100 with respect to the network 102.

The replication database 200 preferably includes one or more files, wherein a first file contains a primary portion of the database and each of the remaining files contain information associated with one of the mobile file groups. The format of each replication database file is similar; specifically, the file comprises a header followed by a plurality of database records, each representing a replicated resource (hereinafter "object"), such as a server, volume, directory or file. Preferably, the records are linked together in an organization similar to that of a typical filing system.

Figure 2:
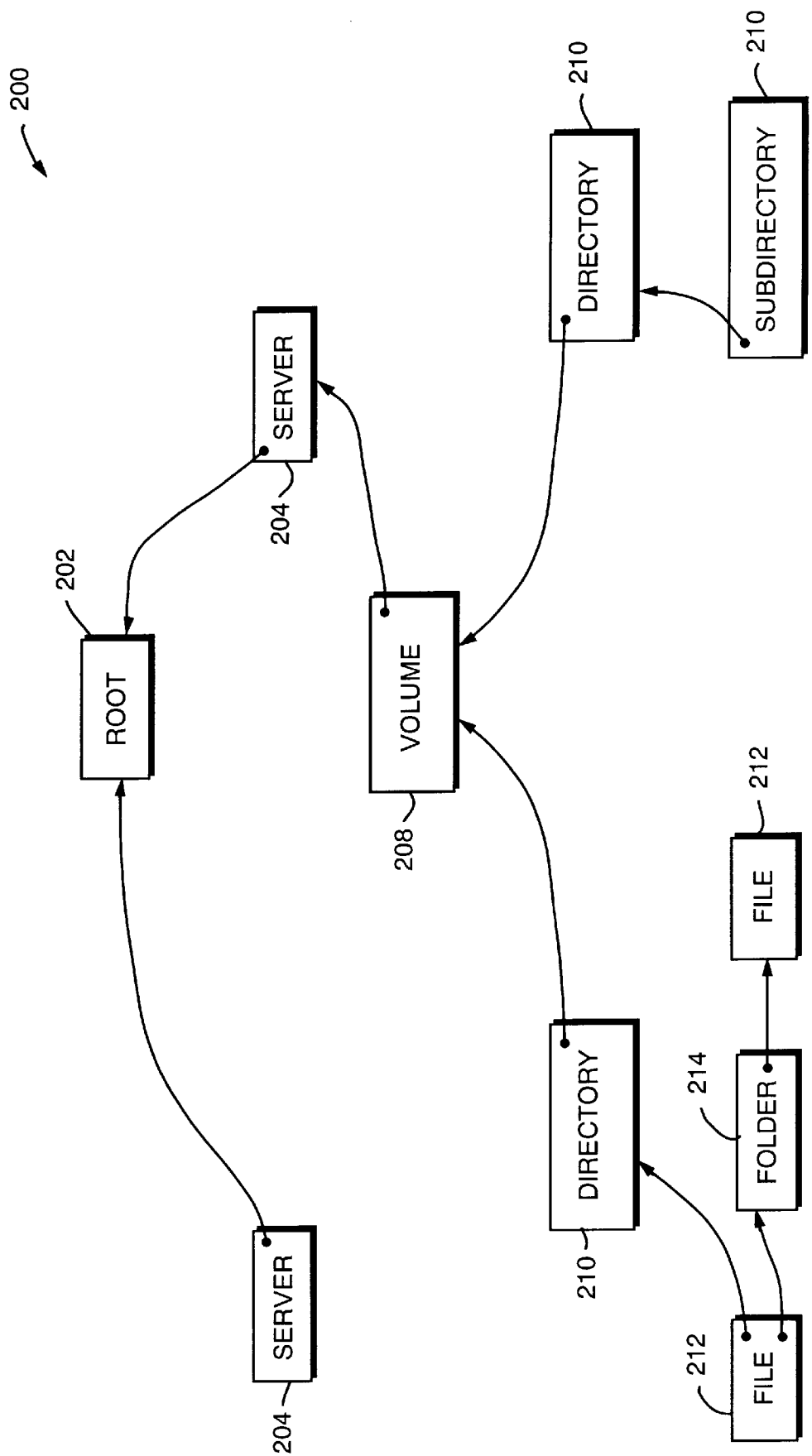
FIG. 2 is a block diagram of an exemplary replication database.

In an illustrative embodiment, software 112 (including MFA) send requests through an application programming interface (API) to the RSE 124. These requests may comprise requests for RSE to (i) replicate a resource, (ii) return status information about a replicated resource, (iii) "unreplicate" a resource and (iv) other such requests. While processing these requests, RSE 124 adds, modifies or removes records in the replication database 200. FIG. 2 illustrates a portion of the replication database 200 comprising a plurality of records, each of which represents a replicated object.

Replication Database

Each record of the database 200 contains a type field that identifies the kind of object represented; most types of records further contain pointers to other records. These pointers are used to indicate relationships between pairs of objects, such as the relationship between a directory and its subdirectory. A container object, such as a directory, is an object that may contain child objects. A chain of pointers is used to indicate a relationship among a group of objects, such as a set of folders (described below) associated with a single file. Each record also typically contains flags and other fields.

In an illustrative embodiment, the replication database 200 contains a root record 202 from which all other records descend. A replicated server is represented by a server record 204.

Replicated volumes are represented by volume records 208 and, similarly, replicated directories and files are represented by directory records 210 and file records 212, respectively. It should be noted that subdirectories are also represented by directory records. The invention provides for full replication of files and directories from a network server into local replicas of the client computer. These local replicas can then be viewed and accessed in an "offline" or disconnected arrangement as if the computer were still connected to the network. In the case of files, the replicated properties include: name, size, date/time last modified, operating system attributes (e.g., read-only, hidden, system, archive), access rights (e.g., read, write, erase, modify) and file contents. In the case of directories, the replicated properties include: name, date/time last modified, operating system attributes (e.g., read-only, hidden, system, archive) and access rights (e.g., read, write, erase, modify).

Figure 3:
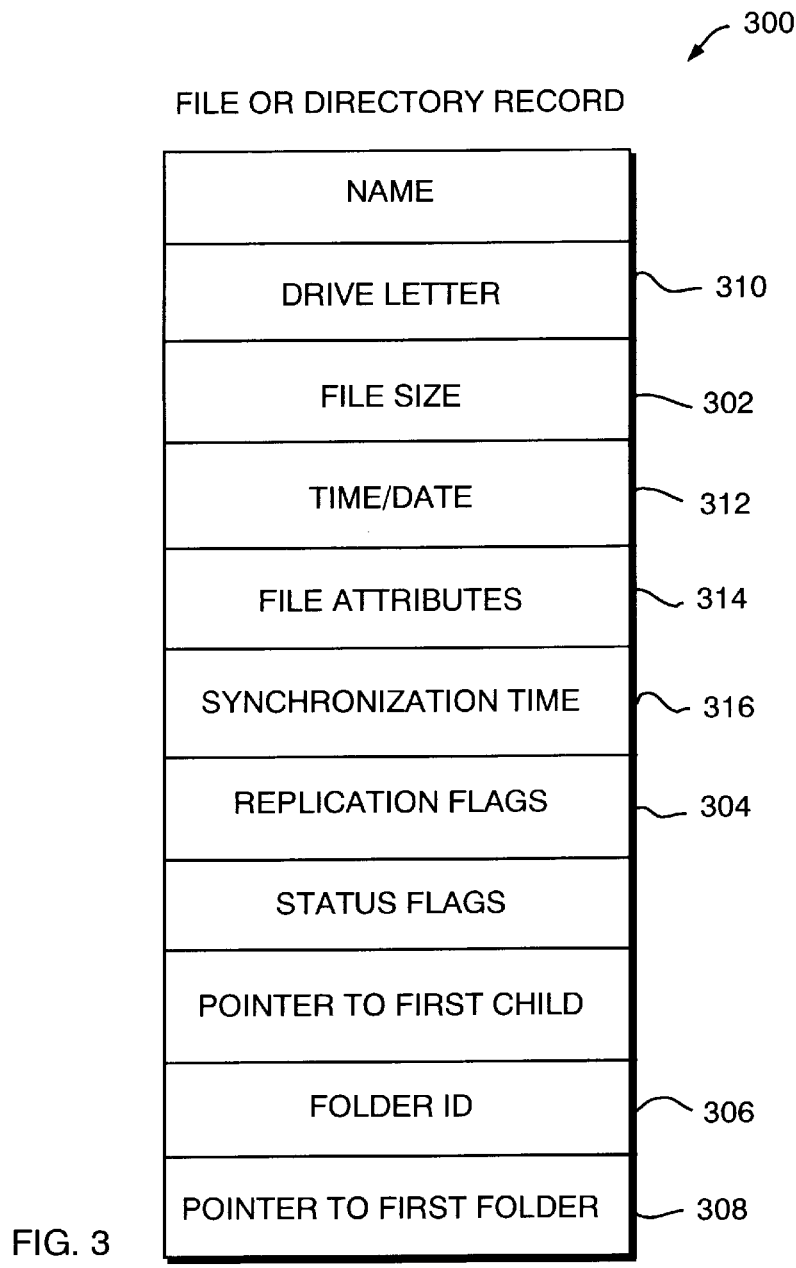
FIG. 3 is a diagram of a file or directory record in the replication database of FIG. 2.

FIG. 3 illustrates an exemplary format of a file, directory or volume record 300. The format of each of these records is similar.

Resource/Object Replication

The invention further provides replication of an entire directory subtree, i.e., the directory and all of its files and sub-directories, which, in turn, involves fully replicating these sub-directories and constituent files. In an alternate embodiment, a directory and its constituent files are fully replicated, but not the sub-directories which are replicated name-only. Also, a file or group of files in a directory may be fully replicated with the other files and sub-directories being replicated name-only. In this latter embodiment, the directory which contains the file or files is implicitly replicated, as described below.

Name-only replication of files and directories comprises replicating only certain properties of these resources, but not all, and modifying their behaviors when accessed offline. Specifically, in the case of a file, name-only replication involves replicating all of the properties described above except for the file's contents. In the case of a directory, all of the properties described above are replicated. Name-only replication is used to preserve the network environment without having to replicate the entire network.

When the computer is disconnected from the network, name-only files cannot be read, modified or deleted by a user (or program) and any attempt to do so results in a warning message displayed on the user interface. Name-only directories cannot be deleted or modified offline and an attempt to do so will result in a warning message displayed on the user interface. Furthermore, name-only directories cannot contain files or subdirectories.

Each object is replicated with one or more explicitly- and/or implicitly-specified replication attributes. Records are added to the replication database 200 according to replication options that are specified in API calls to the RSE 124 and according to replication attributes of parent objects. These attributes, which are stored in a replication flags field 304, include full, name-only, recursive and leaf name-only.

The replication database stores information about two kinds of objects: container objects and leaf objects. A container object is an object that can contain others, whereas a leaf object cannot. For example, a directory is a container object and a file is a leaf object.

The full replication flag specifies that the object is fully replicated. The name-only replication flag signifies that, when applied to a leaf object, the object is replicated name-only but when applied to a container object, the object is implicitly replicated. The recursive flag applies to container objects only. It specifies that the flags of the container, including the recursive flag itself, should be applied to all subcontainers. The leaf name-only flag also applies to containers only, and specifies that the object be replicated name-only."

The following inheritance rules apply to object replication. (1) When explicitly replicating an object, the full flag is set, and all ancestor containers are set to name-only (i.e. they are implicitly replicated). (2) Leaf objects (files) in a replicated container inherit either full or name-only from the container; thus, these objects are name-only in an implicitly replicated container and full in a fully-replicated container. An exception to this rule involves objects created offline in an implicitly replicated container; these objects generally receive the full flag. (3) A container inherits the flags from its parent container only if the container has the recursive flag set; otherwise it is designated leaf name-only. (4) The inheritance rules (2) and (3) can be over-ridden by directly setting the flags for an object (using MFA or another application which makes appropriate API calls to RSE). For example a leaf object in a fully replicated container is normally fully-replicated also, but the flag can be changed to name-only, thus preventing the contents of the file from being copied to the local replica.

Several rules govern implicit replication. If a user chooses to replicate a file, the file's directory is implicitly replicated as are the ancestor directories extending back to the root directory and the volume (and possibly the server) so that the fully replicated file has the same path from the root as it does on the network. To accomplish such replication, RSE 124 begins at the root 202 and traverses the replication database 200 until it reaches the record for the file being copied, adding records for servers 204, volumes 208, directories 210 and file 212, as necessary. If a file that is being replicated in full has previously been replicated in name only, a record already exists for the file. In this case, the RSE 124 changes the replication flags field 304 to indicate full, rather than name-only, replication and copies the file from the server 104 to the client computer 100.

If a directory is implicitly replicated and the directory contains files and/or subdirectories that are not explicitly replicated, these files and/or subdirectories are implicitly replicated in name only. If new files are created in an implicitly-replicated directory while the computer is not connected to the network, these files are copied to the server during synchronization when the computer is reconnected to the network and become fully replicated. However, if new files are created on the server while the computer is not connected to the network, these files are replicated in name only on the computer during synchronization when the computer is reconnected to the network.

If a file is explicitly "unreplicated", i.e., removed, on a computer (using MFA) while the computer is not connected to the network, its contents are deleted from the computer and the file is thereafter replicated in name only. If a directory is explicitly unreplicated, its replication is changed to name-only. All files and subdirectories in the directory are then deleted from the computer and their corresponding records are deleted from the replication database. If any of the files to be deleted have been modified, the user is warned and given the option of preventing the deletion.

When a user chooses to replicate the objects of a mobile file group, the records of the mobile file group's replication database are merged into the primary replication database. It should be noted that some of the objects of the mobile file group may already have been replicated; in this case, the primary replication database contains records for these objects. Records are added from the mobile file group's replication database to the primary replication database to represent objects of the mobile file group only if those objects are not previously represented by records in the primary replication database. The records of previously-represented objects are merely modified; thus, each object is represented by only one record.

In the case of NDS replication, information that is visible to the user when the client computer is connected to the network should also be visible when it is disconnected from the network. To achieve this goal, NDS information that is needed when the computer is offline is copied to the client computer (disk) and arranged in a manner that simulates its original locations on the network. NDS information that is accessed "online" by software programs, such as the login script interpreter 150, is intercepted and copied to the client computer and arranged as described above. NDS replication and offline access to replicated NDS information takes place without any action on behalf of the user such that this information is available to certain programs when the computer is disconnected from the network.

Figure 4:
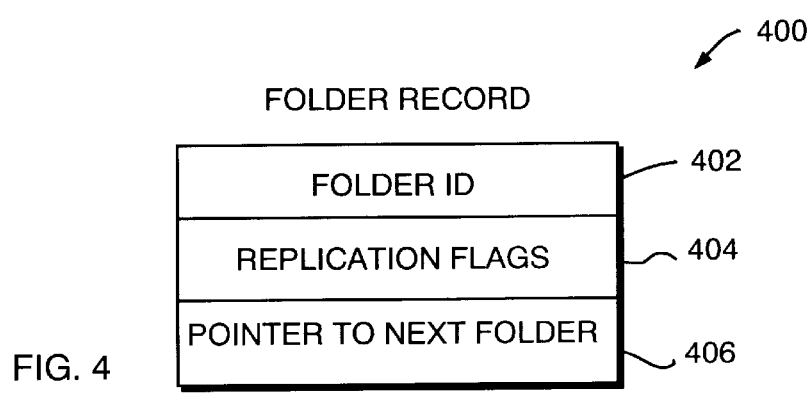
FIG. 4 is a diagram of a folder record in the replication database of FIG. 2.

To facilitate unreplicating of a mobile file group (i.e., removing the records that correspond to the objects of the group) without inadvertently unreplicating previously-replicated objects, the replication database 122 uses folders to keep track of groups of records. Each record preferably belongs to one or more folders. Before a mobile file group is added to the replication database 122, its records are designated to a single, default folder having a folder ID of 0. The folder ID is stored in a folder ID field 306 in the object's record, and a pointer-to-first-folder field 308 is empty. Each mobile file group that is merged into the primary replication database is represented by a new folder having a unique folder ID and the objects of the group are assigned to the new folder. If an object belongs to more than one folder, its folder ID field 306 is empty and its pointer-to-first-folder field 308 points to the first of a chain of folder records 214, as shown in FIG. 2. As shown in FIG. 4, each folder record 400 contains a folder ID field 402, a replication flags field 404 and a pointer-to-next-folder field 406.

If an object belongs to two or more folders, the object may have different replication attributes in each folder. For example, a directory can be fully replicated in one folder but replicated in name only in another folder. Thus, the replication flags are stored separately in the replication flags field 404 in each folder record. A set of "effective" replication flags is formed from the replication flags of each associated folder; these effective flags are stored in the replication flags field 304 in the object's record.

Login Scripts

To complete the process of providing a simulated network that appears to a user as an actual network environment, login scripts must be executed. As noted, the login scripts 138 are typically stored at a central location of the network and are executed by login script interpreters resident on the client computer. Any login scripts or ancillary information that may be needed when the computer is not connected to the network are copied to the computer's disk, but are made to appear as if they are located on the network. An offline login script interpreter 150 performs generally the same tasks as the typical login script interpreter with the exception that it accesses resources of the simulated, offline network rather than the actual one.

Specifically, all login scripts 138 executed by the login script interpreter are copied to a designated area of the computer. The login script interpreter examines each captured script, and copies and evaluates instructions that refer to other secondary login scripts. The captured scripts are then indexed in a manner that allows them to appear as typical login scripts when the computer is disconnected from the network. This process is called consequential script discovery, i.e., examining each script for references to other scripts and replicating those also; consequential script discovery may continue to any depth, and is not limited to the two levels described above.

In addition, the offline login script interpreter 150 is extended to access the replicated network resources. This extended interpreter is then configured to execute the captured login scripts when the user logs into the disconnected computer. Any network data that will be accessed by the captured login scripts when executed by the extended interpreter are replicated and made available on the client computer. Examples of the network data include: the values of NDS objects, date and time information, information pertaining to user groups of which the "offline user" is a member, and information such as the "online user" name (if different) and the network connection number. Such information may be made accessible through built-in variables, i.e., variables that are predefined by the login script interpreter and used in login script instructions. An example of a built-in variable is NETWORK_ADDRESS or the address of the computer when connected to the network. Other information is used internally by the interpreter to resolve expressions, e.g., those containing NDS references.

The offline interpreter 150 is further extended to copy this network data to a persistent cache memory (not shown) when connected to the network. The contents of the cache are indexed and arranged in a manner that allows them to appear as if the computer were connected to the network when operating offline. All replicated information in the cache is refreshed when the computer is connected to the network and a user logs into the connected computer.

Advantageously, the invention allows the user of the client computer to connect and login to multiple network servers and NDS trees at different times on the same network. All information pertaining to these independent login attempts are replicated separately so that the user can login to any of these simulated network servers or trees when the computer is disconnected from the network. Moreover, the login replication and offline login script execution processes are implemented without any action required on behalf of the user.

Synchronization

Often, the replicas 120 stored on the computer 100 become unsynchronized with the network resources 106 stored on the servers 104 because changes have been made to one or both of them. Typically, when a resource (such as a file) is modified, its size, time stamp (time and date of last modification), access rights and/or attributes (such as "read-only," "hidden," or "system file") change. These characteristics of a file are collectively referred to as its state. RSE 124 ascertains whether any changes have occurred using a novel state-based synchronization technique, and if so, synchronizes the replicas 120 with the network resources 106. Preferably, requests for synchronization of all or one or more replicated resources are issued using the MFA application program.

In accordance with the invention, the state-based synchronization technique ascertains whether a replica 120 is different from corresponding network resource 106 stored on the server 104 and, if so, propagates changes from the resource to the replica and from the replica to the resource without comparing the entire contents of the two files.

Synchronization is preferably performed in two stages: a file scan phase and a file copy stage. During the files scan phase, RSE calculates two change types for each object in the part of the replication database being synchronized, wherein one type represents the differences between the state stored in the replication database 200 and the state of the replica 120, and the second type represents the differences between the state stored in the replication database 200 and the state of the network resource 108. Where a change is found an entry is written to a log file (not shown). Examples of these change types are listed in Table 1.

TABLE 1

Possible Change Types

The object has not changed since it was last synchronized.
The object has never been synchronized. (The time of last synchronization is stored in a Synchronization Time field 316 in the record.)
The object has been modified since it was last synchronized.
The object's file attributes, e.g. "system file," have changed since it was last synchronized.
The object no longer exists.
An attempt to update the object on the server would fail because the user does not have sufficient access rights to perform the operation.
An attempt to update the object would fail because it is open by another application.
An object, which was a file at the time of the last synchronization, has been replaced with a directory of the same name.
An object, which was a directory at the time of the last synchronization, has been replaced with a file of the same name.

In the event that changes are detected on the network server and on a replica, a clash is generated, as described further herein. During the second phase of synchronization, each changed object is propagated among the resources on the mobile computer 100 and the servers 104 to bring them into synchrony, and the state of the replication database is updated.

In the illustrative embodiment, any portion or subtree of the replication database 200 can be synchronized. By default, the RSE 124 synchronizes objects represented by the entire replication database 122 but, in an alternate embodiment, RSE can select any record of the database and synchronize only the objects that are represented by the subtree beginning with that record. During the first synchronization phase, RSE 124 first examines the client computer 100 and then the server 104 searching for "new" objects, i.e., objects that exist on the computer or server but that do not have corresponding records in the replication database 122. These new objects are treated according to the "inheritance" rules previously described. RSE 124 examines only those parts of the computer 100 and server 104 that correspond to the (sub)tree that is to be synchronized. Records are added to the replication database 200 for any such new objects.

Clash Handling

Changes to both the replica 120 and the network resource 106 may be incompatible and thus result in a clash, which is usually discovered when RSE attempts to synchronize the resources. Upon detecting an incompatible change, the clash is reported to the user. Examples of incompatible changes include two objects being created with the same name; contents of the same file being modified in the replica and on the network; the contents of a file being modified in either the replica or on the server, and the file being deleted on either the server or in the replica. RSE allows a user to resolve the clash in accordance with an attended mode of operation, whereas in an unattended mode, RSE "skips", i.e., ignores, the clashing resource, i.e., neither the local replica nor the network resource is updated. Leaving the clash unresolved is similar to not performing a synchronization, so the clash can be resolved by performing the synchronization later.

Generally, the clash is ignored if (i) the state of the replica 120 and the network resource 106 are identical (as this is an indication that the same change was made on both the client computer and server) or (ii) the resource has been deleted from both the client computer and the server. Otherwise, RSE 124 allows the user to resolve the clash (in attended mode) or skips the clash (in unattended mode). When resolving a clash, the network resource 106 is generally considered a "master" and its changes are preserved in favor of changes made to the replica 120. Thus, the RSE presents two options to the user: (a) rename the replica 120, copy the network resource 104 to the client computer 100 and copy the renamed replica to the server 106 or (b) overwrite the replica with the network resource.

In summary, the inventive RSE mechanism provides a user of a mobile computer with a consistent namespace of resources available to a network despite the connection status of the computer. RSE provides such a consistent namespace by maintaining complete, local replicas of a user-selected subset of these resources at the mobile computer, along with local name-only representations of the remaining resources. As a result, the specifications of the resources as viewed by the user when the computer is connected to the network are identical to the specifications as viewed by the user when the computer is disconnected from the network.

Figure 5A:
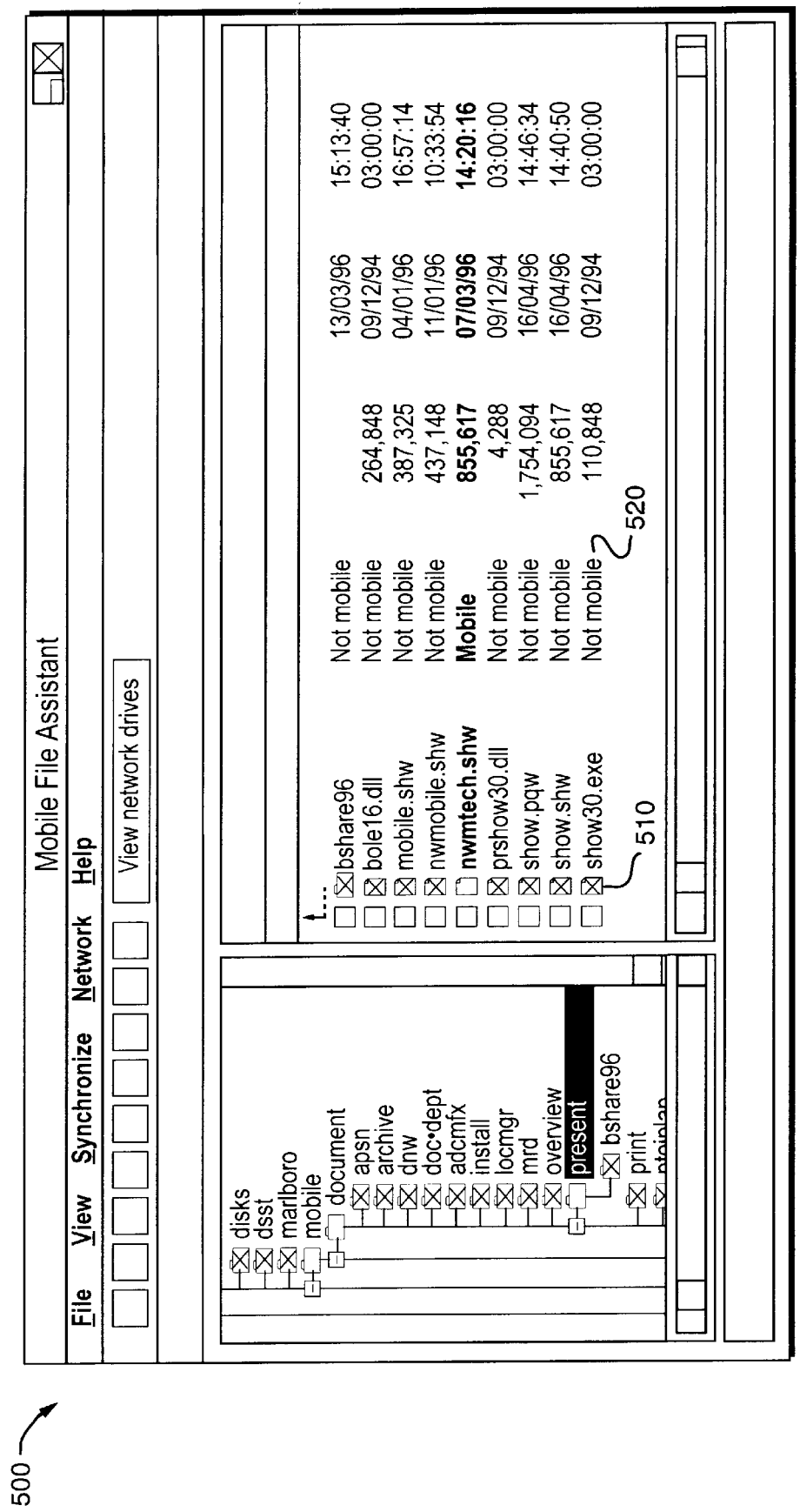
FIG. 5A is a diagram of an embodiment of a mobile file assistant (MFA) user interface in accordance with the invention.
Figure 5B:
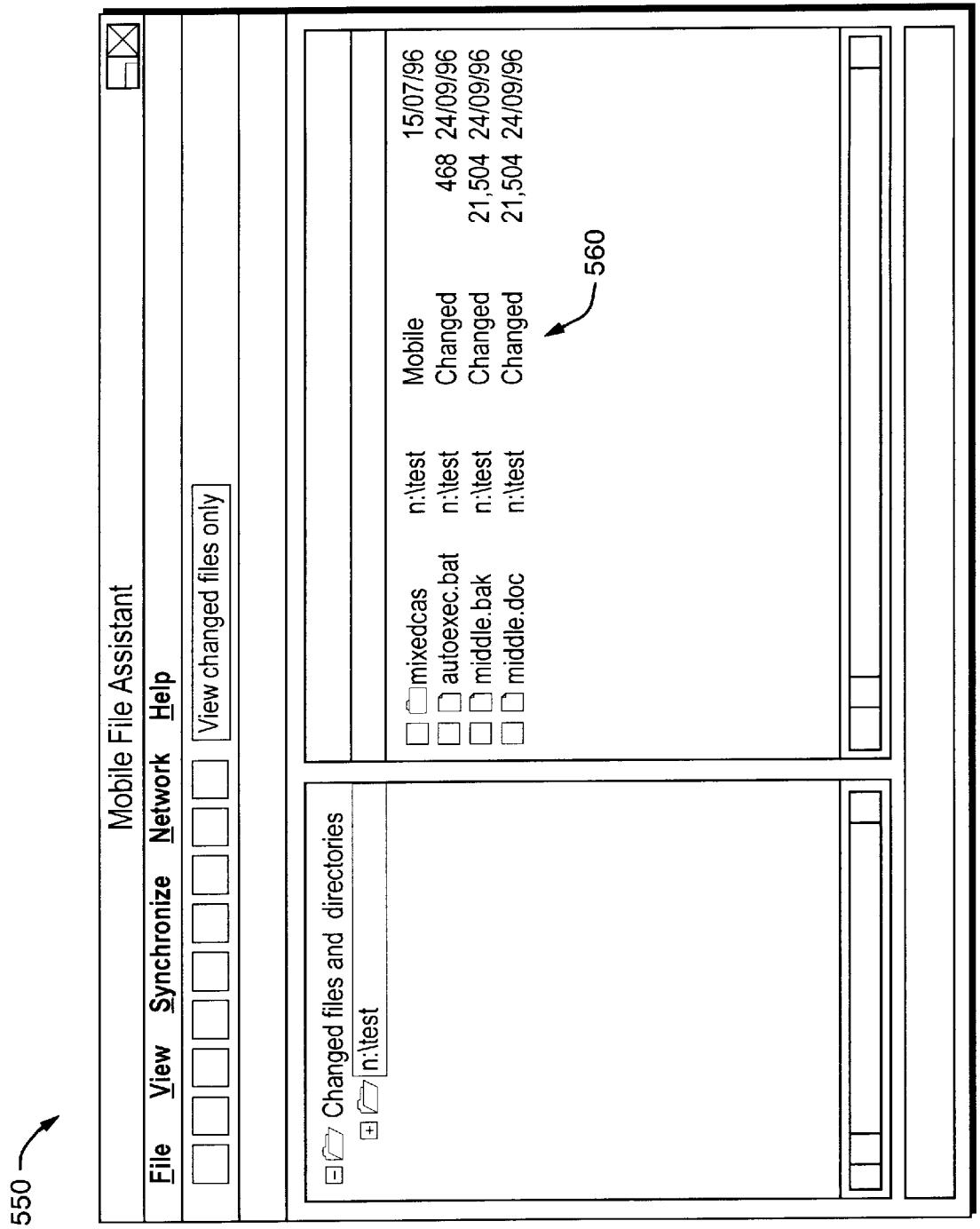
FIG. 5B is a diagram of another embodiment of the MFA user interface in accordance with the invention.

The MFA application program 128 manifests the consistent namespace by allowing the user to view the contents of all network drives showing the replication status of each network resource. In accordance with an aspect of the invention, the user may view a list of all replicated resources (files and directories). FIG. 5A is a diagram of a MFA user interface 500 showing replicated data on the client computer when offline or disconnected from the network. Note the cross symbols 510 and status cues 520 indicating that the files and directories are not fully mobile. Also, the user may utilize the MFA program to view a list of modified replicated file and directory resources. FIG. 5B is a diagram of the MFA user interface 550 with status cues 560 set to view files as "changed". It is noted that a resource is modified when the replica and/or the network resource are modified and not synchronized. The MFA application program 128 may be further configured to list and request replication of most-recently used files, while a device driver (not shown) may be used to monitor and store information about network files accessed by a user.

Name-only resources contribute to the consistent namespace presented by RSE because these resources appear available to a user of the computer even though the computer is not connected to the network. The computer user may ascertain, and in some cases modify, attributes of these resources, yet the user cannot access, e.g., read or write, the contents of the resources. In contrast, local replicas are completely reproduced on the mobile computer and, thus, any access (e.g., read or write) requests issued by a user or application when the mobile computer is not connected to the network may be directed to these replicas.

While there has been shown and described an illustrative embodiment for providing a user of a mobile computer with a consistent namespace of resources available to a network despite the connection status of the computer, it is to be understood that various other adaptations and modifications may be made within the spirit and scope of the invention. For example in an alternate embodiment of the invention, when a user attempts to access a name-only resource, RSE may establish a communication link, e.g., over a cellular telephone, with the network and transfer the contents of the resource to the computer so as to create a local replica of that resource. Thereafter, the user has full access to that replicated resource, even after the computer is disconnected from the network.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A computer for connection to a computer network of servers configured to provide access to network resources, the computer comprising:

means for storing local replicas of selected ones of the network resources;

a software program stored on the storing means and executed by the computer, the software program generating requests to access the network resources, including the local replicas; and a replication and synchronization engine (RSE), coupled to the storing means, for receiving the requests from the software program to access the selected network resources and for operating selectively to provide access to the selected network resources in a first mode when the computer is connected to the network and in a second mode when the computer is not connected to the network, the RSE maintaining coherency of the network resources by synchronizing contents of the local replicas with contents of the selected network resources using a multi-stage synchronization technique, the multi-stage synchronization technique invoked during the first mode of operation to effect synchronization, when the computer is connected to the network after being disconnected from the network, by comparing current state characteristics of the local replicas and the selected network resources rather than comparing their entire contents;

wherein said computer is configured both to capture a login script when the computer is connected to the network in the first mode and to cause the captured login script to appear as a typical login script when the computer is disconnected from the network in the second mode of operation.

2. The computer of claim 1 further comprising means for replicating the selected ones of network resources from the network servers to the computer to create the local replicas.

3. The computer of claim 2 further comprising means for viewing properties of the local replicas when the computer is not connected to the network, the properties including the state characteristics.

4. The computer of claim 3 wherein the local replicas include a file and wherein the properties of the file include a name, a size, time last modified, access rights, attributes and file contents.

5. The computer of claim 4 wherein the local replicas further include a directory and wherein the properties of the directory include a name, time last modified, access rights and attributes.

6. The computer of claim 5 wherein the software program is a mobile file assistant (MFA) and wherein the viewing means is a user interface of MFA for displaying to a user a consistent namespace of resources available to a network despite a connection status of the computer.

7. The computer of claim 6 wherein RSE provides the user with the consistent namespace by maintaining the local replicas along with name-only replications of remaining ones of the network resources.

8. The computer of claim 7 wherein the name-only replications have selected ones of the properties of the local replicas.

9. The computer of claim 1 wherein the storing means comprises a replication database, and wherein the local replicas comprise objects accessible by the computer.

10. The computer of claim 9 wherein the multi-stage synchronization technique comprises a first stage that calculates change types for the objects stored in the replication database and a second stage that synchronizes any changed objects in the replication database by propagating changes from the objects to the selected network resources.

11. The computer of claim 10 wherein a first change type represents the difference between the state stored in the replication database and the state of the local replica.

12. The computer of claim 11 wherein a second change type represents the difference between the state stored in the replication database and the state of the selected network resource.

13. The computer of claim 12 wherein the replication database is part of an NDS database located autonomous to the computer.

14. The computer of claim 6 further comprising a login script interpreter configured to capture the login script when the computer is connected to the network in the first mode, the captured login script containing map commands executed by the login script interpreter to provide the consistent namespace of resources.

15. The computer of claim 14 wherein the login script interpreter further examines the login script for references to other scripts and replicates those referenced scripts.

16. A method for connecting a computer to a computer network of servers configured to provide access to network resources, the method comprising the steps of:

storing local replicas of selected ones of the network resources in a replication database;

generating requests to access the network resources, including the local replicas;

receiving the requests at a replication and synchronization engine to access the selected network resources and to provide access to the selected network resources in a first mode when the computer is connected to the network and in a second mode when the computer is not connected to the network;

synchronizing contents of the local replicas with contents of the selected network resources using a multi-stage synchronization technique that compares current state characteristics of the local replicas and the selected network resources to maintain coherency of the network resources;

capturing a login script when the computer is connected to the network in the first mode; and causing the captured login script to appear as a typical login script when the computer is disconnected from the network in the second mode of operation.

17. The method of claim 16 wherein the step of synchronizing further comprises the steps of:

calculating change types for the replicas stored in the replication database; and synchronizing any changed replicas in the replication database by propagating changes from the replicas to the selected network resources.

18. The method of claim 16 further comprising the steps of:

using a login script interpreter to capture the login script in the first mode, the captured login script containing map commands; and executing the map commands using the login script interpreter to provide a consistent namespace of resources.

19. The method of claim 16 wherein the step of capturing further comprises the steps of:

examining the captured login script for references to other secondary login scripts; and replicating those referenced secondary login scripts.

20. The method of claim 18 further comprising the step of indexing the captured login script at a designated area of the computer so as to make the captured login script appear as a typical login script when the computer is disconnected from the network in the second mode of operation.

* * * * *